US011608954B2

(12) United States Patent
Bong et al.

(10) Patent No.: US 11,608,954 B2
(45) Date of Patent: Mar. 21, 2023

(54) VEHICLE LAMP STRUCTURE HAVING A HOUSING WITH A LIGHT DIFFUSION UNIT, A COVER UNIT, AND A LIGHT GUIDE

(71) Applicants: HYUNDAI MOTOR COMPANY, Seoul (KR); KIA CORPORATION, Seoul (KR); SL MIRRORTECH CORPORATION, Siheung-si (KR)

(72) Inventors: Heung Sun Bong, Seoul (KR); Jin Hee Lee, Seoul (KR); Chan Mook Choi, Incheon (KR); Chang Byung Ryu, Siheung-si (KR); Yong Hwan Kim, Siheung-si (KR)

(73) Assignees: HYUNDAI MOTOR COMPANY, Seoul (KR); KIA CORPORATION, Seoul (KR); SL MIRRORTECH CORPORATION, Siheung-si (KR)

( * ) Notice: Subject to any disclaimer, the term of this patent is extended or adjusted under 35 U.S.C. 154(b) by 0 days.

(21) Appl. No.: 17/544,634

(22) Filed: Dec. 7, 2021

(65) Prior Publication Data
US 2022/0325864 A1 Oct. 13, 2022

(30) Foreign Application Priority Data
Apr. 12, 2021 (KR) .................. 10-2021-0047022

(51) Int. Cl.
*F21S 41/20* (2018.01)
*B60Q 1/00* (2006.01)

(52) U.S. Cl.
CPC .......... *F21S 41/285* (2018.01); *B60Q 1/0011* (2013.01); *B60Q 1/0023* (2013.01); *F21S 41/28* (2018.01)

(58) Field of Classification Search
CPC ........ F21S 41/28; F21S 41/285; F21W 41/28; B60Q 1/0023; B60Q 1/0011
See application file for complete search history.

(56) References Cited

U.S. PATENT DOCUMENTS

| 10,793,054 B2* | 10/2020 | Neal ................. B60Q 1/24 |
| 10,875,466 B2 | 12/2020 | Sawada et al. |
| 11,293,616 B1* | 4/2022 | Ahn ................. F21S 41/322 |
| 2020/0018457 A1* | 1/2020 | Enomoto ............. F21S 43/40 |
| 2020/0070737 A1 | 3/2020 | Sawada et al. |

FOREIGN PATENT DOCUMENTS

| JP | 2017228464 A | 12/2017 |
| JP | 2020032822 A | 3/2020 |
| KR | 100807812 B1 | 2/2008 |
| KR | 20110002497 U | 3/2011 |

* cited by examiner

*Primary Examiner* — Robert J May
(74) *Attorney, Agent, or Firm* — Lempia Summerfield Katz LLC (57) ABSTRACT

A vehicle lamp structure includes a housing located at the side of a vehicle and a lamp assembly located inside the housing. The lamp assembly includes a bezel fixed to the housing and a light diffusion unit located at the bezel. The light diffusion unit includes at least two surfaces and a light guide located inside the light diffusion unit. The light guide includes at least two optic surfaces configured to reflect light introduced thereinto. The lamp assembly also includes a light irradiation unit fastened to the light guide and being configured to irradiate light along the light guide.

10 Claims, 4 Drawing Sheets

[ SECTION B-B ]

FIG. 7

VEHICLE LAMP STRUCTURE HAVING A HOUSING WITH A LIGHT DIFFUSION UNIT, A COVER UNIT, AND A LIGHT GUIDE

CROSS-REFERENCE TO RELATED APPLICATION

This application claims, under 35 U.S.C. § 119(a), the benefit of priority to Korean Patent Application No. 10-2021-0047022 filed on Apr. 12, 2021, the entire contents of which are incorporated herein by reference.

BACKGROUND

(a) Technical Field

The present disclosure relates to a vehicle lamp structure, and more particularly to a vehicle lamp structure including a fastening relationship between a light diffusion unit, a light guide, and a cover unit in order to provide a plurality of lighting regions.

(b) Background Art

In general, a vehicle is provided with a lighting device configured to irradiate light necessary to recognize objects in a driving direction during night driving and to inform other vehicles or people on a road of the driving state thereof. A headlamp is a lamp having a function of casting light onto a road ahead of the vehicle in an advancing direction and requires brightness necessary to recognize obstacles on the road in front of the vehicle and relatively distant therefrom at night.

In addition, there are lamps configured to inform drivers of surrounding vehicles of the width, location, and turning intentions of the vehicle. For example, a sidelight may be installed to allow drivers of surrounding vehicles to recognize the location and width of the vehicle. In addition, turn indicators are provided to inform rear vehicles behind the vehicle or front vehicles in front of the vehicle of the advancing direction of the vehicle while driving.

Meanwhile, an LED light source having a relatively small amount of light, low power consumption, and high durability is applied to a lamp. In most cases, a plurality of LED light sources is provided. Assembly of the structure is not easy due to a plurality of lines configured to supply power to the plurality of LED light sources. In addition, wiring may be complicated due to the plurality of lines.

In addition, for a recent vehicle equipped with a camera monitor system (CMS), various wires must be disposed inside a side mirror housing, and therefore a simple LED light source fastening structure is necessary. Furthermore, technology capable of enabling light introduced through an LED light source to be applied in a longitudinal direction of the lamp so as to provide a sufficient amount of light is essentially required.

The above information disclosed in this Background section is provided only to enhance understanding of the background of the disclosure. Therefore, the Background section may contain information that does not form the prior art that is already known in this country to a person of ordinary skill in the art.

SUMMARY

The present disclosure has been made in an effort to solve the above-described problems associated with the prior art.

It is an object of the present disclosure to provide a vehicle lamp structure configured to have a multidirectional lighting region instead of including a single optic surface configured to perform only one-direction lighting.

It is another object of the present disclosure to provide a vehicle lamp structure including a light guide configured such that light having uniform brightness is irradiated to the multidirectional lighting region.

The objects of the present disclosure are not limited to those described above. The objects of the present disclosure should be clearly understood from the following description of embodiments and could be implemented by means defined in the claims and a combination thereof.

In order to accomplish the above objects, a vehicle lamp structure according to the present disclosure includes the following construction.

In one aspect, the vehicle lamp structure includes a housing located at the side of a vehicle and a lamp assembly located inside the housing. The lamp assembly includes a bezel fixed to the housing and a light diffusion unit located at the bezel. The light diffusion unit includes at least two surfaces and a light guide located inside the light diffusion unit. The light guide includes at least two optic surfaces configured to reflect light introduced thereinto. The lamp assembly also includes a light irradiation unit fastened to the light guide and being configured to irradiate light along the light guide.

In addition, the vehicle lamp structure may further include a cover unit configured to wrap a portion of at least one of the surfaces of the light diffusion unit.

The cover unit may be located at at least two adjacent surfaces of the light diffusion unit. Adjacent ones of the cover units may be located so as to have a predetermined distance therebetween.

The cover unit may be located at each of the upper surface and the side surface of the light diffusion unit. A portion of the light diffusion unit exposed between the cover units may include a lighting region.

The light guide may include at least one optic surface corresponding to the lighting region.

The vehicle lamp structure may include two cover units configured to wrap the outer surface of the light guide. Four lighting regions may be located at ends of the two cover units.

The optic surface located inside the light guide may include four surfaces perpendicular to light irradiated to the outside of the light diffusion unit.

At least one of the optic surfaces may be configured such that the distance between protrusions located in a region adjacent to the light irradiation unit is greater than the distance between protrusions located in a region far from the light irradiation unit.

At least one of the optic surfaces may include protrusions spaced apart from each other by the same distance.

The bezel may include an upper end bezel at which the light guide and the light diffusion unit are located and a lower end bezel located at a lower surface corresponding to the upper end bezel. The light irradiation unit may be located at the lower end bezel.

The vehicle lamp structure may include a camera unit provided inside the housing. The camera unit may be configured to capture a vehicle side image.

Other aspects and embodiments of the disclosure are discussed below.

BRIEF DESCRIPTION OF THE DRAWINGS

The above and other features of the present disclosure are now described in detail with reference to certain embodiments thereof illustrated in the accompanying drawings, which are given hereinbelow by way of illustration only, and thus are not limitative of the present disclosure, and wherein.

It should be understood that the appended drawings are not necessarily to scale, presenting a somewhat simplified representation of various features illustrative of the basic principles of the inventive concept. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Reference is now made in detail to various embodiments of the present disclosure, examples of which are illustrated in the accompanying drawings and described below. However, the present inventive concept may be embodied in many different forms and should not be construed as limited to the embodiments set forth herein. Rather, these embodiments are provided so that the present disclosure is thorough and complete, and fully conveys the scope of the present inventive concept to those having ordinary skill in the art. The embodiments are merely given to make the disclosure of the present inventive concept clear and understandable to those of ordinary skill in the art.

The term "unit" used in this specification signifies one unit that processes at least one function or operation, and may be realized by hardware, software, or a combination thereof.

In addition, the terms "first" and "second" are used in this specification only to distinguish between the same elements. The elements are not limited as to the sequence therebetween in the following description.

In addition, the "width" described in this specification may be interpreted to be the length of one surface in section.

Hereinafter, embodiments are described in detail with reference to the accompanying drawings. In describing the embodiments with reference to the accompanying drawings, identical or corresponding components are denoted by the same reference numerals, and a duplicate description thereof has been omitted.

The present disclosure relates to a vehicle lamp structure, wherein a housing 100 including a lamp assembly 10 is located at the outermost side of a lamp and the lamp assembly 10 emits light in response to side signal input of a vehicle.

Furthermore, the lamp may be controlled by a controller configured to receive user input and to perform control such that power is supplied to a light irradiation unit 600 based on the received input. A battery configured to be mounted in the vehicle or a battery located in the lamp structure may be used as a component configured to supply power to the light irradiation unit 600.

In one embodiment, the lamp structure according to the present disclosure is mounted to a side mirror including a camera monitor system (CMS) separately mounted to the vehicle. The camera monitor system is configured such that at least a portion of a camera unit 700 is located through an open space outside the housing 100 and such that a vehicle side image is captured using the camera unit 700 and is displayed through a display unit located in the vehicle.

Figure 1:
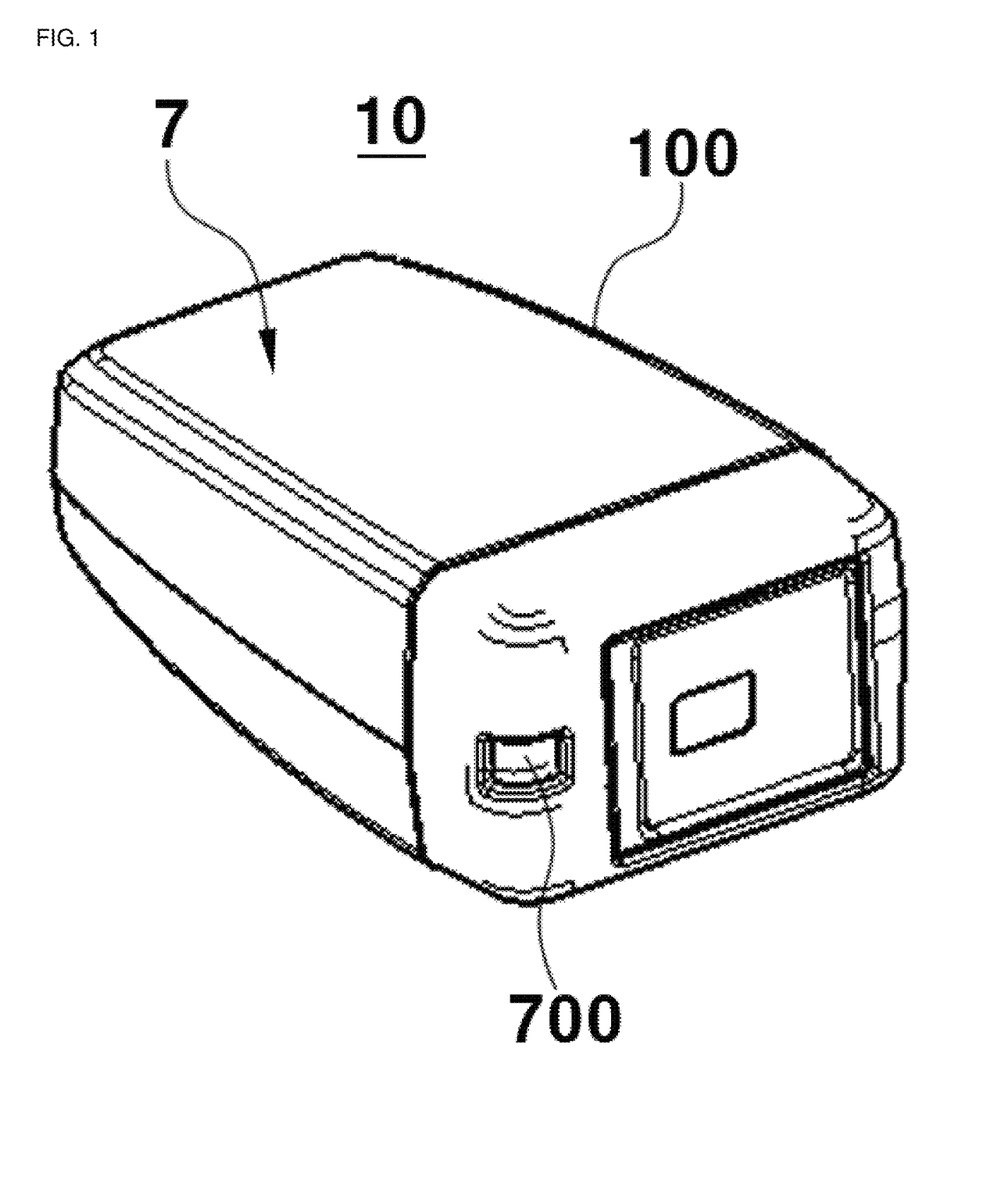
FIG. 1 is a perspective view of a vehicle lamp structure according to an embodiment of the present disclosure.
Figure 2:
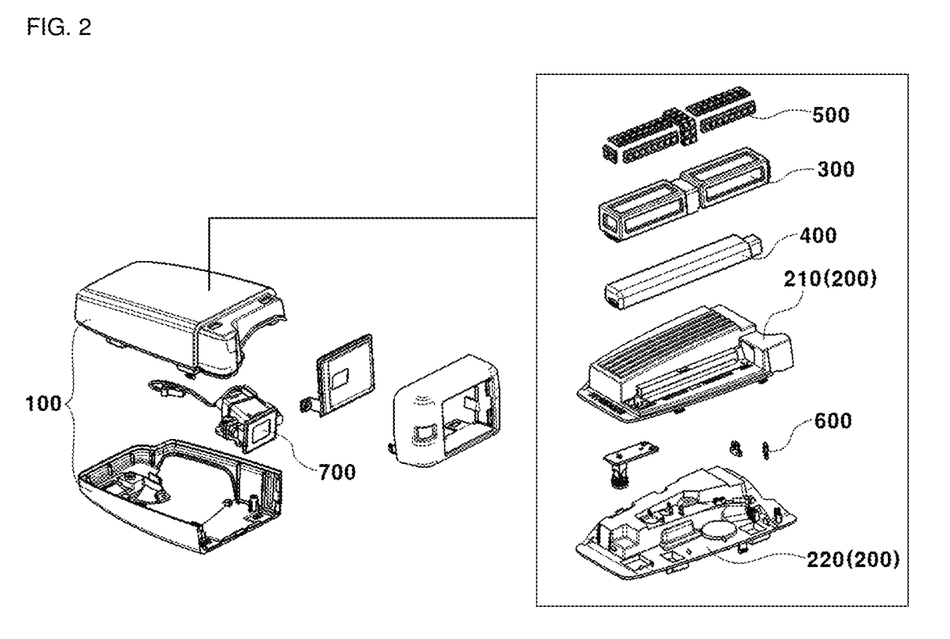
FIG. 2 is a view showing the construction of the vehicle lamp structure according to the embodiment of the present disclosure.

FIG. 1 shows a side mirror in which a vehicle lamp structure according to an embodiment of the present disclosure is mounted, and FIG. 2 shows the construction of the vehicle lamp structure.

As shown, the lamp structure according to the present disclosure includes a housing 100 located at each side of a vehicle so as to be exposed outside and a lamp assembly including a plurality of lighting regions 310 is located inside the housing 100. The lamp assembly 10 includes a light irradiation unit 600 disposed on a bezel 200 located in the housing 100 and a light guide 400 configured to guide light irradiated by the light irradiation unit 600 so as to be introduced in a longitudinal direction of the housing 100. In addition, the lamp assembly includes a light diffusion unit 300 configured to wrap the outer surface of the light guide 400. The light diffusion unit 300 is fixed to the bezel 200, and at least two the light diffusion units 300 may be provided to diffuse light introduced from the light guide 400.

The bezel 200 may include an upper end bezel 210 including the light diffusion unit 300 and the light guide 400 and a lower end bezel 220 at which the light irradiation unit 600 is located. The assembled bezel 200 may be fixed to the inside of the housing 100.

In the vehicle lamp structure according to the embodiment of the present disclosure, the light diffusion unit 300 is configured to have a quadrangular section. The light guide 400, which is located in the light diffusion unit 300, is also configured to have a quadrangular section so as to face the inner surface of the light diffusion unit 300. Light may be irradiated out of the light diffusion unit 300 through at least two surfaces of the quadrangular section. In addition, the light irradiation unit 600 is configured to receive power from the vehicle and may be fixed to the bezel 200. In one embodiment, the light irradiation unit 600 is constituted by a light emitting diode (LED). The LED is described by way of example as the light irradiation unit 600 and the LED may be typically used as a light source of the vehicle lamp. However, the present disclosure is not limited thereto. Any light source configured to emit light for vehicle lighting may be used irrespective of the particular kind or type.

One end of the light guide 400 is configured to face the light irradiation unit 600 and light incident from the light irradiation unit 600 moves in the longitudinal direction of the inside of the light guide 400. In an embodiment of the present disclosure, the light guide 400 is configured to have a polygonal section and includes at least two optic surfaces 410. In an embodiment of the present disclosure, the light guide 400 is configured to reflect light introduced through the light irradiation unit 600 in the longitudinal direction and includes a plurality of optic surfaces 410 configured to reflect light to the lighting regions 310. In other words, the optic surface 410 may include a plurality of protrusions 420 configured to guide movement of light introduced into the light guide 400 in both the longitudinal direction and the lateral direction of the light guide 400. Consequently, light incident on the inner surface of the light guide 400 through the light irradiation unit 600 may be reflected by the protrusions 420 of the optic surfaces 410 so as to be uniformly dispersed on the light guide 400.

As described above, the optic surface 410 according to the present disclosure may include at least two optic surfaces formed at the inner surface of the light guide 400 and is defined as a concept including a surface capable of totally reflecting incident light. In an embodiment of the present disclosure, the optic surface 410 is configured as a surface including a plurality of protrusions 410. Light introduced from the light irradiation unit 600 is reflected by the section of the light guide 400 in a leftward-rightward direction or in an upward-downward direction and moves to the lighting regions 310 of the light diffusion unit 300.

At least a portion of the inner surface of the light diffusion unit 300 may be located so as to be adjacent to or to abut the outer surface of the light guide 400. At least a portion of the outer surface of the light diffusion unit 300 may be wrapped by a cover unit 500. In an embodiment of the present disclosure, the light diffusion unit 300 includes two surfaces exposed to the outside of the vehicle and a cover unit 500 is located at each of the two surfaces.

In one embodiment, at least a portion of the cover unit 500 is located in a recess formed in the light diffusion unit 300.

At least a portion of the cover unit 500 may be located at the outer surface of the light diffusion unit 300. In the case in which the light diffusion unit 300 includes two surfaces exposed outside, the cover unit 500 may be located at each of the two surfaces of the light diffusion unit 300.

The cover unit 500 is configured to have a smaller area than the surface formed by the light diffusion unit 300. The light diffusion unit 300 is exposed at ends of the cover units 500 that are far from each other and the light diffusion unit 300 is exposed between ends of the cover units 500 that are adjacent to each other. The exposed light diffusion unit 300 is set as the lighting regions 310. In the case in which the light diffusion unit 300 has two surfaces, the light diffusion unit 300 may include a lighting region 310 located at the outermost end of each of the cover units 500 and a light region 310 located between the adjacent ends of the cover units 500.

The lamp assembly 10 may include at least one light diffusion unit 300 and the light diffusion unit 300 may include a light guide 400 and a cover unit 500. In other words, one lamp assembly 10 may include one or more light diffusion units 300 and may include a single light irradiation unit 600 configured to irradiate light to the plurality of light diffusion units 300.

In an embodiment of the present disclosure, two light diffusion units 300 may be located in the longitudinal direction of the housing 100. The light guide 400 located at each of the light diffusion units 300 may be coupled such that light is introduced from the light irradiation unit 600 along an adjacent one of the light guides 400.

Figure 3A:
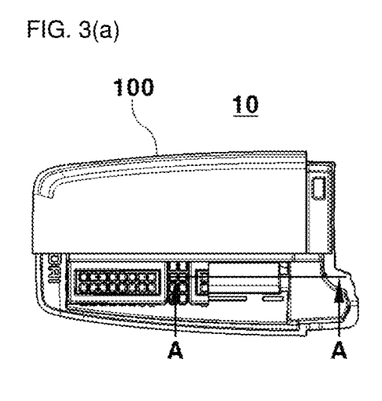
FIG. 3(a) is a plan view of the vehicle lamp structure according to the embodiment of the present disclosure.
Figure 3B:
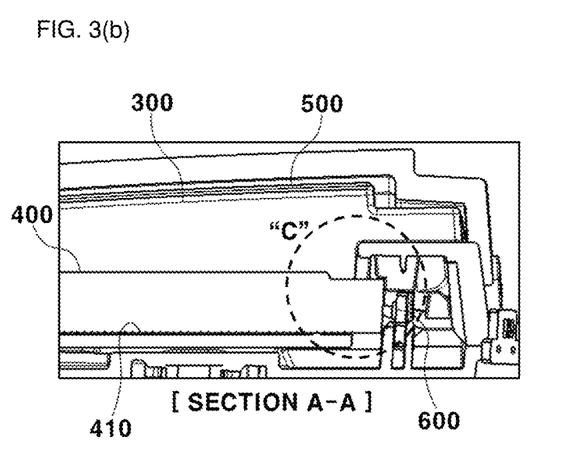
FIG. 3(b) is a sectional view along line A-A of the vehicle lamp structure of FIG. 3(a) according to the embodiment of the present disclosure.

FIGS. 3(a) and 3(b) are a plan view of the vehicle lamp structure according to the embodiment of the present disclosure and a sectional view along line A-A showing coupling between the light guide 400 and the light irradiation unit 600 according to the embodiment of the present disclosure, respectively.

The light diffusion unit 300 according to the present disclosure is located in the longitudinal direction of the housing 100. The lighting region 310 of the light diffusion unit 300 is configured to be recognized outside through the exposed region of the housing 100. In one embodiment, the light irradiation unit 600 located at the bezel 200 is located so as to adjacent to one end of the light guide. Light irradiated by the light irradiation unit 600 moves in the longitudinal direction of the light guide 400 along the optic surface 410 of the light guide 400.

In an embodiment of the present disclosure, the light irradiation unit 600 may be constituted by an LED and may be configured to provide the same amount of light through the plurality of protrusions 420 located at the optic surface 410 in the longitudinal direction and the lateral direction of the light guide 400. In one embodiment, the light irradiation unit 600 is located at the lower end bezel 220 so as to receive power from the vehicle. Light from the light irradiation unit 600 irradiates the lighting region 310 of the light diffusion unit 300 through the light guide 400 located at the upper end bezel 210.

As shown in FIG. 3(b), the inner surface of the light guide 400 includes at least one optic surface 410. Light incident from the light irradiation unit 600 is reflected to a space inside the light guide 400. In one embodiment, light introduced through the light irradiation unit 600 is totally reflected along the optic surface 410 and the same amount of light is provided along the light guide 400.

Figure 4:
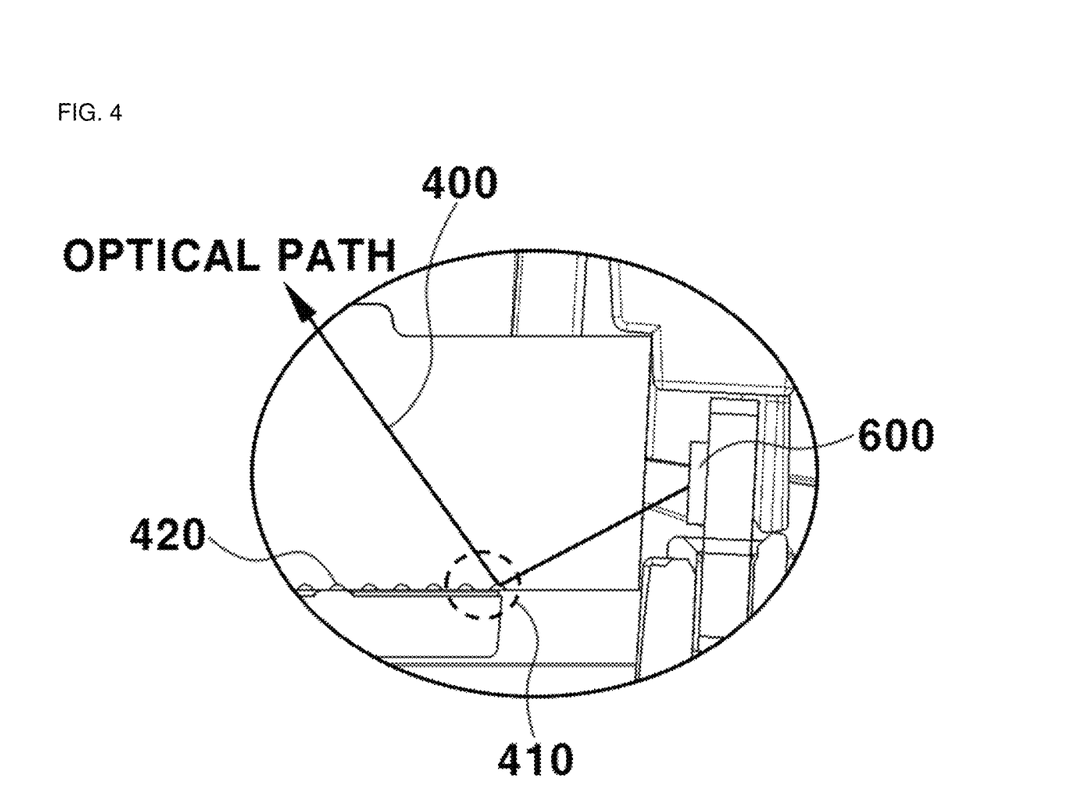
FIG. 4 is an enlarged view of a coupling structure between a light guide and a light irradiation unit according to an embodiment of the present disclosure.

FIG. 4 is an enlarged view of region C shown in FIG. 3(b), showing an optical path along which light introduced into the inside of the light guide 400 from the LED as the light irradiation unit 600 is reflected along the optic surface 410 in the longitudinal direction of the light guide 400.

The optic surface 410 may be constituted by at least one surface inside the light guide 400. In one embodiment, light introduced from the light irradiation unit 600 in the longitudinal direction of the light guide 400 may move to the optic surface 410. Different optic surfaces 410 may be provided such that light reflected inside the light guide 400 is irradiated to the outside of the light diffusion unit 300 along the lighting regions 310.

Figure 5:
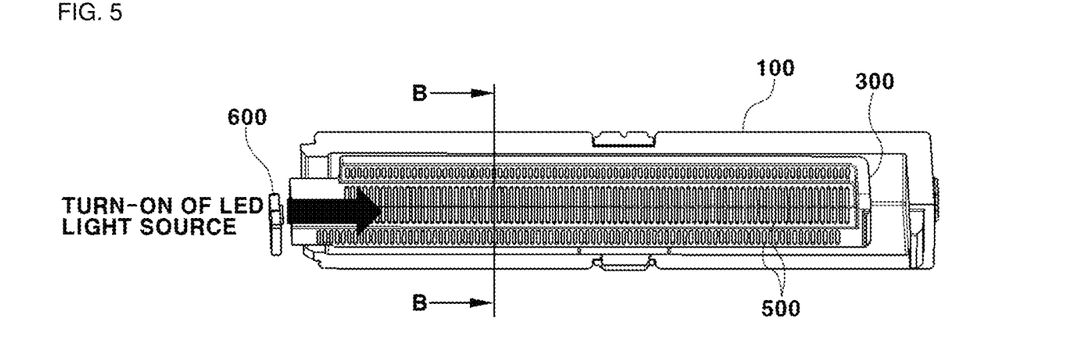
FIG. 5 is a front view of the vehicle lamp structure according to the embodiment of the present disclosure.
Figure 6:
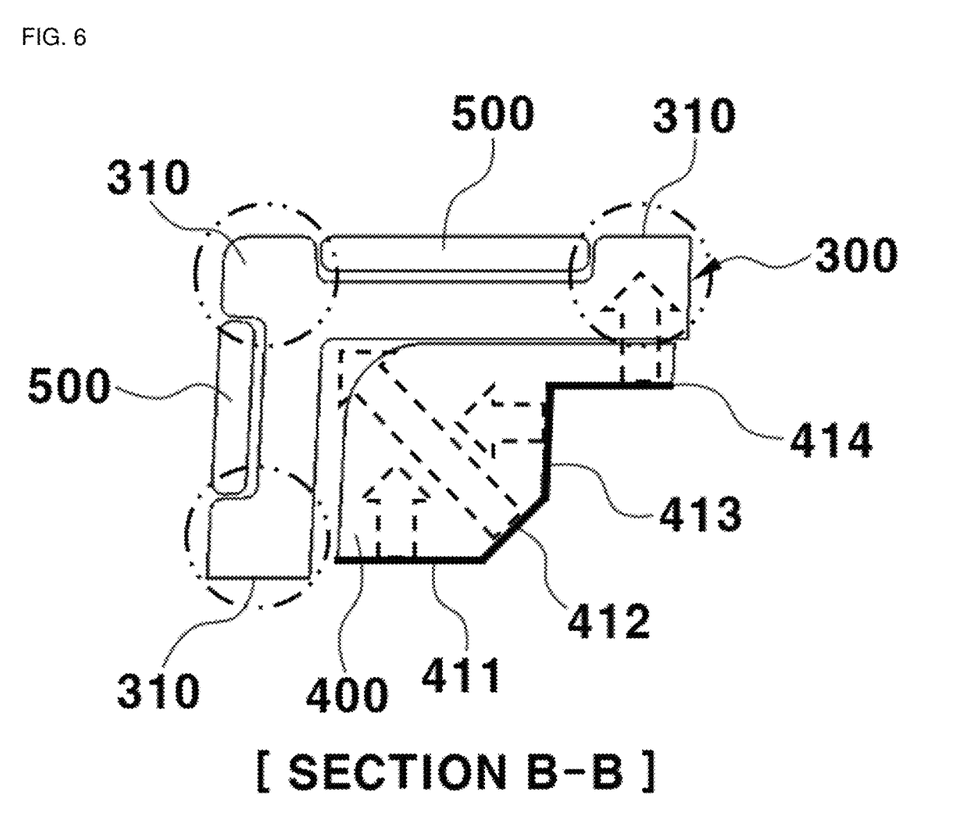
FIG. 6 is a sectional view along line B-B of the vehicle lamp structure of FIG. 5 according to the embodiment of the present disclosure.

FIGS. 5 and 6 are a front view of the light diffusion unit 300 including the cover unit 500 and a sectional view taken along line B-B, respectively.

The light diffusion unit 300 has at least two exposed surfaces formed in the housing 100 and light applied from the light guide 400 is irradiated to the outside of the light diffusion unit 300 along the exposed surfaces. The cover unit 500 is made of a material that exhibits no light transmittance and is configured to wrap at least a portion of the outer surface of the light diffusion unit 300. The housing 100 is made of at least a material that exhibits light transmittance. In one embodiment, the housing 100 is configured so as to be transparent or semitransparent such that the lighting region 310 can be recognized outside the housing 100.

The cover unit 500 according to the present disclosure is configured to be located at each of the two exposed surfaces of the light diffusion unit 300. Opposite ends of each cover unit 500 are located such that a portion of the light diffusion unit 300 is exposed. The exposed region of the light diffusion unit 300 is a lighting region 310 and light introduced from the light guide 400 is irradiated to the outside of the light diffusion unit 300.

In the embodiment shown, the outermost surface of the light diffusion unit 300 is configured to have a quadrangular sectional shape. The cover unit 500 is located at at least a portion of the outer surface of the light diffusion unit 300 so as to have a smaller area than the outer surface of the light diffusion unit 300. In one embodiment, the cover unit 500 is configured to have a length equal to the length of the outermost surface of the light diffusion unit 300 and to have a height smaller than the height of the outermost surface of the light diffusion unit 300. Consequently, in an embodiment of the present disclosure, as shown in FIG. 5, the upper end light diffusion unit 300 is configured to be exposed.

In addition, as shown in FIG. 6, which is a sectional view along line B-B of the light guide 400, the light diffusion unit 300, and the cover unit 500, an embodiment of the present disclosure is configured to include three lighting regions 310.

In order to provide the three lighting regions 310, two cover units 500 are configured and located to wrap the two surfaces of the light diffusion unit and at least three optic surfaces 410 configured to correspond to the respective lighting regions 310 are included.

As shown, the light diffusion unit 300 includes two light emitting surfaces and each of the upper surface and the side surface thereof formed as the light emitting surfaces is configured to have a predetermined angle. Furthermore, among the plurality of optic surfaces 410, the first optic surface 411 is located at the lowermost end of the light guide in a height direction so as to correspond to the uppermost surface of the light diffusion unit 300 and the third optic surface 413 is located so as to correspond the side surface of the light diffusion unit 300. Furthermore, the second optic surface 412 may be located so as to face the position at which the upper surface and the side surface of the light diffusion unit 300 abut. The fourth optic surface 414 may be configured to correspond to the lighting region 310 of the light diffusion unit 300 exposed at one side of the upper end of the light diffusion unit 300.

In one embodiment, the first optic surface 411 is configured such that light is entirely irradiated to the light guide 400. The third optic surface 413 is located so as to be perpendicular to the first optic surface 411 and the second optic surface 412 is located between the first optic surface 411 and the third optic surface 413 so as to have an inclination. The inclination of the second optic surface 412 is configured to face the light emitting regions formed at adjacent ends of the cover units 500.

In addition, the fourth optic surface 414 is located at the upper end of the third optic surface 413 in the height direction in a state of being parallel to the first optic surface 411. The fourth optic surface 414 is configured to face the lighting region formed at the other end of the cover unit 500 located at one surface of the light diffusion unit 300 such that light is irradiated to the lighting region.

In brief, the first and third optic surfaces 411 and 413 are configured such that light introduced from the light irradiation unit 600 is irradiated to the wide region inside the light guide 400. The second optic surface 412 is configured so as to face the lighting region formed between adjacent ends of the cover units 500 such that light is irradiated to the lighting region. The fourth optic surface 414 is configured so as to face the lighting region formed at one end of the cover unit 500 located there above such that light is irradiated to the lighting region.

In addition, the width of the second optic surface 412 may be set such that a sufficient amount of light is provided to the lighting region formed between adjacent ends of the cover units 500. Also, the width of the fourth optic surface may be set such that a sufficient amount of light is provided to the lighting region corresponding to one end of each cover unit 500. In addition, the first optic surface 411 and the third optic surface 413 are configured to have larger widths than the second optic surface 412 and the fourth optic surface 414 such that light introduced from the light irradiation unit 600 through the first optic surface 411 and the third optic surface 413 easily move in the longitudinal direction of the light guide 400.

In an embodiment of the present disclosure, when viewed in section, the first optic surface 411 has a width of 4.5 mm, the second optic surface 412 has a width of 3 mm in an inclined state, the third optic surface 413 has a width of 4 mm in the height direction, and the fourth optic surface 414 has a width of 3 mm in a state of being parallel to the first optic surface 411.

As described above, the first optic surface 411 and the third optic surface 413 are configured to have larger widths than the second optic surface 412 and the fourth optic surface 414 such that light is irradiated to the wide region of the light guide 400.

In other words, in an embodiment of the present disclosure including four optic surfaces 410, the optic surfaces may be configured to face the exposed lighting regions of the light diffusion unit 300 such that light introduced into the light guide 400 is irradiated through the lighting regions.

In the present disclosure, as described above, at least one optic surface 410 corresponding to one lighting region 310 is included and the optic surface is configured to provide a sufficient amount of light that is irradiated to the outside of the light diffusion unit 300 through the lighting region 310. In other words, the light guide 400 including the plurality of optic surfaces 410 may be configured to move light introduced from the light irradiation unit 600 in the longitudinal direction of the light guide 400 and to provide a sufficient amount of light to the lighting region 310.

Figure 7:
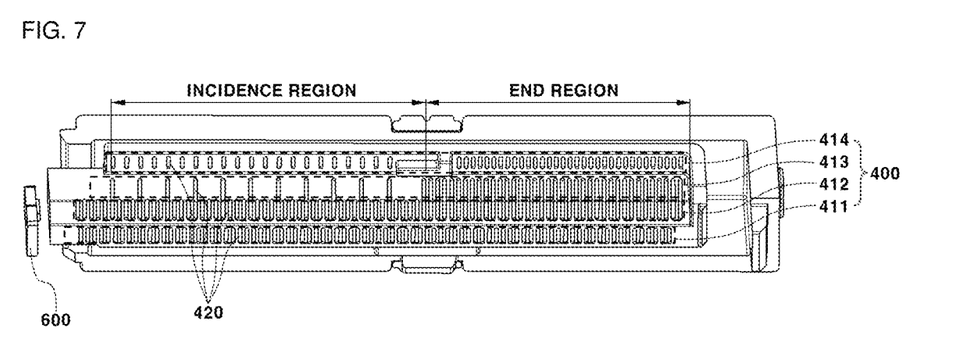
FIG. 7 is a side view of the light guide of the vehicle lamp structure according to the embodiment of the present disclosure.

FIG. 7 is a side view of a light guide 400 including a plurality of optic surfaces according to an embodiment of the present disclosure.

The light guide 400 according to the present disclosure includes first to fourth optic surfaces 411, 412, 413, and 414. Each of the optic surfaces 411, 412, 413, and 414 includes a plurality of protrusions 420 disposed in the longitudinal direction of the light guide 400.

In one embodiment, each of the first optic surface 411 and the second optic surface 412 includes protrusions 420 spaced apart from each other by the same distance in the longitudinal direction of the inside of the light guide 400. The distance between the protrusions 420 located in an incidence region of the fourth optic surface 414 is greater than the distance between the protrusions 420 located in an end region of the fourth optic surface 414.

The third optic surface 413 may include protrusions 420 spaced apart from each other by the same distance. Alternatively, the distance between the protrusions 420 located in the incidence region of the third optic surface 413 may be greater than the distance between the protrusions 420 located in the end region of the third optic surface 413.

The incidence region means a region in which light introduced from the light irradiation unit 600 moves along the light guide 400 without light loss. The end region means a region that is far from the light irradiation unit 600, compared to the incidence region, and thus has low light density.

In other words, the fourth optic surface 414 is configured such that the distance between the protrusions 420 in the end region is less than the distance between the protrusions 420 in the incidence region. The fourth optic surface 414 may be configured such that light introduced into the end region is more frequently reflected and thus the same amount of light is provided to the end region. Consequently, the amount of light may be uniform in the longitudinal direction of the inside of the light guide 400, whereby the amounts of light that is transmitted through the plurality of lighting regions may be uniform.

Consequently, an optic surface having a relatively small width may be configured such that the distance between the protrusions 420 in the end region is less than the distance between the protrusions 420 in the incidence region in order to prevent deficiency in amount of light due to light loss and thus the amounts of light provided to the lighting regions are uniform.

As is apparent from the foregoing, the present disclosure may have the following effects from the construction, combination, and use of the embodiments described above.

The present disclosure provides a vehicle lamp structure including a multidirectional lighting region, whereby vehicle driving safety is improved.

In addition, the present disclosure provides a complex lighting region having uniform brightness, whereby signal visibility is improved.

The above detailed description illustrates the present inventive concept. In addition, the foregoing describes specific embodiments of the present disclosure. The embodiments of the present disclosure may be used in various different combinations, changes, and environments. In other words, variations or modifications can be made within the conceptual scope of the present disclosure, equivalents to the disclosure of the present inventive concept, and/or the scope of technology and knowledge in the art to which the present disclosure pertains. The embodiments describe the best mode for realizing the technical concept of the present disclosure and variations required for the concrete application and use of the present disclosure are possible. Therefore, the above detailed description does not limit the present inventive concept disclosed above. In addition, the appended claims should be interpreted to include other embodiments.

What is claimed is:

1. A vehicle lamp structure comprising:
    a housing located at an outermost side of the lamp structure; and
    a lamp assembly located inside the housing,
    wherein the lamp assembly includes
        a bezel fixed to the housing,
        a light diffusion unit located at the bezel,
        a cover unit configured to wrap a portion of the light diffusion unit,
        a light guide located inside the light diffusion unit, the light guide having optic surfaces configured to reflect light introduced thereinto,
        a light irradiation unit fastened to the light guide, the light irradiation unit being configured to irradiate light along the light guide,
        first protrusions; and
        second protrusions,
    wherein the optic surfaces of the light guide correspond to a lighting region, and
    wherein at least one of the optic surfaces is configured such that a distance between the first protrusions located in a region adjacent to the light irradiation unit is greater than a distance between the second protrusions located in a region far from the light irradiation unit.

2. The vehicle lamp structure according to claim 1, wherein
    the light diffusion unit comprises a plurality of surfaces,
    the cover unit includes a cover unit located at each of the surfaces of the light diffusion unit, and
    adjacent ends of adjacent ones of the cover units are located so as to have a predetermined distance therebetween.

3. The vehicle lamp structure according to claim 1, wherein
    the light diffusion unit comprises at least an upper surface and a side surface adjacent to each other,
    the cover unit is located at each of the upper surface and the side surface of the light diffusion unit, and
    a portion of the light diffusion unit exposed from an end of the cover unit constitutes the lighting region.

4. The vehicle lamp structure according to claim 1, wherein the optic surfaces located inside the light guide comprise four optic surfaces corresponding to the lighting region.

5. The vehicle lamp structure according to claim 4, wherein at least one of the four optic surfaces comprises protrusions spaced apart from each other by an identical distance.

6. The vehicle lamp structure according to claim 4, wherein the four optic surfaces comprise:
    a first optic surface located at a rear surface of the light guide;
    a third optic surface located so as to be perpendicular to the first optic surface;
    a second optic surface located between the first optic surface and the third optic surface, the second optic surface having a predetermined inclination; and
    a fourth optic surface extending from an end of the third optic surface, the fourth optic surface being parallel to the first optic surface.

7. The vehicle lamp structure according to claim 6, wherein the first optic surface and the third optic surface have greater widths than the second optic surface and the fourth optic surface.

8. The vehicle lamp structure according to claim 1, wherein the bezel comprises:
    an upper end bezel at which the light guide and the light diffusion unit are located; and
    a lower end bezel located at a lower surface corresponding to the upper end bezel, the light irradiation unit being located at the lower end bezel.

9. The vehicle lamp structure according to claim 1, further comprising a camera unit provided inside the housing, the camera unit being configured to capture a vehicle side image.

10. A vehicle lamp structure comprising:
    a housing located at an outermost side of the lamp structure; and
    a lamp assembly located inside the housing,
    wherein the lamp assembly includes
        a bezel fixed to the housing,
        a light diffusion unit located at the bezel,
        a cover unit configured to wrap a portion of the light diffusion unit,
        a light guide located inside the light diffusion unit, the light guide having an optic surface configured to reflect light introduced thereinto, and
        a light irradiation unit fastened to the light guide, the light irradiation unit being configured to irradiate light along the light guide, and wherein the bezel includes an upper end bezel at which the light guide and the light diffusion unit are located and a lower end bezel located at a lower surface corresponding to the upper end bezel, the light irradiation unit being located at the lower end bezel.

* * * * *